United States Patent [19]

Krapcho et al.

[11] 3,852,279
[45] Dec. 3, 1974

[54] 7-SUBSTITUTED -3,3A,4,5,6,7-HEXAHYDRO-3-SUBSTITUTED-2H- PYRAZOLO (4,3-C)PYRIDINES

[75] Inventors: John Krapcho, Somerset; Chester Frank Turk, Elizabeth, both of N.J.

[73] Assignee: E. R. Squibb & Sons, Inc., Princeton, N.J.

[22] Filed: Mar. 12, 1973

[21] Appl. No.: 340,408

[52] U.S. Cl. ...... 260/240 F, 260/240 R, 260/240.7, 424/263
[51] Int. Cl. ...................... C09b 23/00, C09b 23/04
[58] Field of Search .......... 260/240 F, 240.7, 240 R

[56] References Cited
OTHER PUBLICATIONS

Schenone et al., Farmaco, Ed. Sci. 1971, pp. 857 to 867 (abst. in Chem. Abstracts, vol. 76, no. 34073k (1972).

Nair et al., Indian J. Chem. 1967, 5(10), pp. 464 to 466 (abst. in Chem. Abstracts vol. 69, no. 27383p, (1968).

Wiley, Pyrazoles, Pyrazolines, Pyrazolidines, Indazoles and Condensed Rings, pages 137–139 and 315–317, Interscieno Publishers, NY (1967).

*Primary Examiner*—John D. Randolph
*Attorney, Agent, or Firm*—Lawrence S. Levinson; Merle J. Smith; Stephen B. Davis

[57] ABSTRACT

7-substituted-3,3a,4,5,6,7-hexahydro-3-substituted-2H-pyrazolo[4,3-e]pyridines and the acid addition salts thereof are reported. In addition, method for preparing said compounds, pharmaceutical compositions containing said compounds and methods for using said compositions as central nervous system depressants are disclosed.

9 Claims, No Drawings

7-SUBSTITUTED-3,3A,4,5,6,7-HEXAHYDRO-3-SUBSTITUTED-2H-PYRAZOLO (4,3-C) PYRIDINES

This invention relates to compounds of the formula:

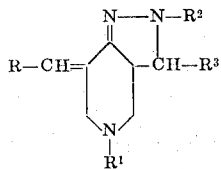

wherein R and R³ are

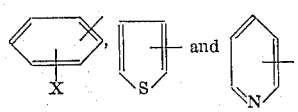

X and X¹ are hydrogen, chloro, fluoro, lower alkyl, lower alkoxy or trifluoromethyl; R¹ and R² are hydrogen, lower alkyl,

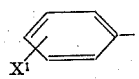

lower alkyl, hydroxy lower alkyl or lower alkanoyl and N-oxides and the acid addition salts thereof.

In addition, this invention encompasses the methods for preparing said compounds, pharmaceutical compositions containing said compounds and methods for using said compositions as central nervous system depressants.

The term "lower alkyl" is intended to mean a straight or branched hydrocarbon fragment of from one to eight carbon atoms.

The term "lower alkoxy" is intended to mean "lower alkyl—O—."

The term "lower alkanoyl" is intended to mean

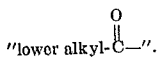

The term "acid addition salts" is intended to means salts which may be formed for the purpose of isolation, purification and storage, such as the oxalate salt, etc. and pharmaceutically acceptable salts meant for administration of the compound to a host, such as the hydrochloride, sulfate, acetate, citrate, etc.

The compounds of this invention are prepared in the following manner. Compounds of the formula II

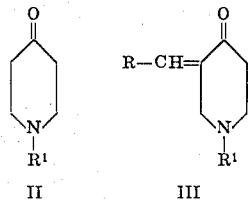

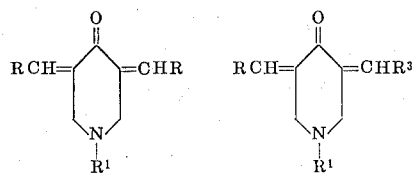

wherein R¹ is as previously defined, are reacted with compounds of the formula RCHO, wherein R is as previously defined utilizing the reaction procedure described in The Journal of the American Chemical Society, 70, 1824 (1948), which is incorporated by reference, to give compounds of the formula IV. By adjusting the ratio of reactants so as to have an excess of the compound of formula II present, compounds of formula III are prepared.

Compounds of the formula V are prepared by reacting compounds of the formula III with an aldehyde of the formula R³CHO, wherein R³ is as previously described, in the manner described in The Journal of the American Chemical Society, 70, 1824 (1948).

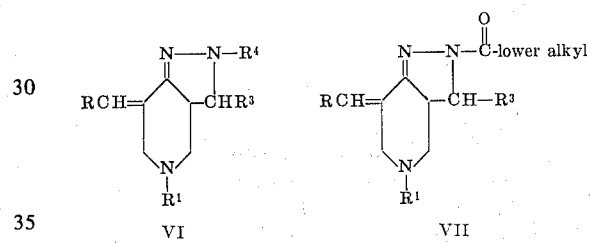

The compounds of the formulae IV and V are generally isolated in the form of their acid addition salts, except where R¹ is lower alkanoyl.

The salts of compounds of the formulae IV and V, such as the hydrochloride salt, sulfate salt, phosphate salt, etc., are converted to a compound of the formula VI by reaction with a hydrazine of the formula H₂NNHR⁴, wherein R⁴ is hydrogen, lower alkyl,

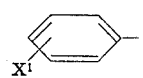

lower alkyl or hydroxy lower alkyl, in an organic solvent, preferably an alcohol of up to four carbon atoms at temperatures of from about 40°C to about 120°c, preferably at about the reflux temperature of the solvent, for from about ½ hour to about 12 hours, preferably 4 hours. The compounds are generally purified in the form of a mono- or di-acid addition salt.

Compounds of the formula VII, that is hydrazide type compounds, are formed by standard acylation reactions employing acylating reagents such as acetic anhydride, propionyl chloride, etc., in inert solvents, such as benzene, ether, etc.

Wherein a basic amino group is present in a compound of the formulae VI and VII, said compound may be converted to its N-oxide by reaction with an oxidizing agent such as hydrogen peroxide, peracetic acid, etc.

The preferred compounds prepared by these procedures are those wherein R and $R^3$ are phenyl, X and $X^1$ are hydrogen, $R^1$ is lower alkyl or hydrogen and $R^2$ is lower alkyl.

The 7-substituted-3,3a,4,5,6,7-hexahydro-3-substituted-2H-pyrazolo [4,3-c]pyridines, their N-oxides and their nontoxic pharmaceutically acceptable mono- or di-acid addition salts are useful as central nervous system depressants in mammals when administered in amounts ranging from about 0.5 mg. to about 10.0 mg. per kg. of body weight per day. A preferred dosage regimen for optimum results would be from about 1 mg. to about 5 mg. per kg. of body weight per day, and such dosage units are employed that a total of from about 35 mg. to about 7 g of active ingredient for a subject of about 70 kg body weight are administered in a 24 hour period.

The compounds of the present invention in the described dosages are intended to be administered orally; however, other routes, such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1 percent of active compound. The percentage in the compositions and preparations may, of course, be varied and may conveniently be between about 5 percent to about 75 percent or more of the weight of the unit. The amount of active compound in such therapeutically useful compositions or preparations is such that a suitable dosage will be obtained. Preferred compositions or preparations according to the present invention are prepared so that an oral dosage unit form contains between about 2 and 500 milligrams of active compound, preferably between 2 and 25 mg.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

DETAILED DESCRIPTION

The following examples are provided for illustrative purposes and may include particular features of the invention; however, the examples should not be construed as limiting the invention, many variations of which are possible without departing from the spirit or scope thereof.

EXAMPLE 1

7-Benzylidene-3,3a,4,5,6,7-hexahydro-5-methyl-3-phenyl- 2H-pyrazolo[4,3-c]pyridine, hydrochloride (1:2)

A. 3,5-Dibenzylidene-1-methyl-4-piperidone, hydrochloride

A solution of 57.0 g (0.5 mole) of 1-methyl-4-piperidone and 106.0 g (1.0 mole) of benzaldehyde in 400 ml of ethanol is cooled in an ice bath and treated with HCl gas until 250 g is absorbed. The red-colored solution is allowed to stand at room temperature overnight. The resulting deep red-brown solution is seeded, allowed to stand overnight at room temperature, and the crystalline solid is filtered on a sintered-glass funnel and washed with cold ethanol, followed by ether. After drying in a desiccator, the solid (146 g) is digested in 400 ml of hot ethanol (75°), cooled and filtered to give 120 g (74 percent) of pale yellow product, m.p. 242°–244° (dec).

Recrystallization of 11 g of this material from 35 ml of dimethylformamide (DMF) gives 9.2 g of product, m.p. 242°–244° (dec).

B. 7-Benzylidene-3,3a,4,5,6,7-hexahydro-5-methyl-3-phenyl 2H-pyrazolo[4,3-c]pyridine, hydrochloride (1:2)

A suspension of 10 g of the 3,5-dibenzylidene-1-methyl-4-piperidone HCl in 100 ml of MeOH is treated with 1.8 g (0.031 mole) of hydrazine hydrate. The mixture is heated and the resulting solution is refluxed for four hours. The solvent is evaporated at reduced pressure to give 11.7 g of yellow amorphous product, mp 99°–100° (this mono Hcl is only sl. soluble in $H_2O$). The latter is triturated with 200 ml of warm acetonitrile, filtered off the colorless insoluble material (0.35 g, mp 130°–135°) and the filtrate is treated with 4.6 ml of 6.7 N alcoholic HCl. The di-HCl initially separates as a light brown gum and then changes to a pale yellow amorphous solid. After standing in the cold overnight, the product is filtered and dried in a desiccator, weight, 9.4 g (80 percent), mp 152°–154° (dec). This material does not crystallize from the usual organic solvents. The major portion (8.6 g) is suspended in 30 ml of $CHCl_3$ for 30 minutes, filtered, washed with $CHCl_3$ and ether to give 8.4 g (78 percent) of pale yellow product, mp 162°–164° (dec).

EXAMPLE 2

7-Benzylidene-3,3a,4,5,6,7-hexahydro-2,5-dimethyl-3-phenyl- 2H-pyrazolo-[4,3-c]-pyridine,hydrochloride (1:2)

A suspension of 10.0 g (0.0306 mole) of 3,5-dibenzylidene-1-methyl-4-piperidone hydrochloride (Example 1) in 100 ml of MeOH is treated with 1.5 g (0.0306 mole) of methylhydrazine, heated and the resulting solution is refluxed for four hours. The solvent is removed on a rotary evaporator and the crystalline yellow solid (12.6 g, mp 102°–105°) is dissolved in 100 ml of CH$_3$CN and treated with 4.6 ml of 6.7 N alcoholic HCl. The crystalline dihydrochloride salt separates after several minutes. The mixture is allowed to stand at room temperature for 3 hours, filtered, washed with cold CH$_3$CN and ether and dried in a desiccator to give 11.3 g of yellow product, mp 154°–156° (dec). This material is suspended in 100 ml of methanol, warmed slightly to obtain a solution and the latter diluted to 400 ml with ether. The product separates as large clusters of plate-like crystals at room temperature. After cooling overnight, the pale yellow product is filtered and dried in desiccator; weight, 10.0 g (80 percent), mp 157°–159° (dec).

EXAMPLES 3–5

7-Heterocyclylidene-3,3a,4,5,6,7-hexahydro-2,5-dimethyl-3-heterocyclic-2H-pyrazolo[4,3-c]pyridine, hydrochlorides A. 3,5-Disubstituted-1-methyl-4-piperidones According to the procedure of Example 1, upon substituting in place of benzaldehyde, one of the following compounds:
  thiophene-2-carboxaldehyde
  pyridine-4-carboxaldehyde
  thiophene-3-carboxaldehyde
one obtains:
  3,5-bis-(2-thienylidene)-1-methyl-4-piperidone, hydrochloride;
  3,5-bis(4-pyridylidene)-1-methyl-4-piperidone, hydrochloride;
  3,5-bis-(3-thienylidene)-1-methyl-4-piperidone, hydrochloride,
respectively.

B. 7-Heterocyclylidene-3,3a,4,5,6,7-hexahydro-2,5-dimethyl-3-heterocyclic-2H-pyrazolo[4,3-c]pyridine, hydrochlorides According to the procedure of Example 2, upon substituting the above compounds, one obtains:
  7-(2-thienylidene)-3-(2-thienyl)-3,3a,4,5,6,7-hexahydro-2,5-dimethyl-3-2H-pyrazolo[4,3-c]pyridine, hydrochloride;
  7-(4-pyridylidene)-3,3a,4,5,6,7-hexahydro-2,5-dimethyl-3-(4-pyridyl)-2H-pyrazolo[4,3-c]pyridine, hydrochloride;
  and 7-(3-thienylidene)-3,3a,4,5,6,7-hexahydro-2,5-dimethyl-3-(3-thienyl)-2H-pyrazolo[4,3-c]pyridine, hydrochloride
respectively.

EXAMPLE 6

7-(o-Chlorobenzylidene)-3-(o-chlorophenyl)-3,3a,4,5,6,7-hexahydro-2,5-dimethyl-2H-pyrazolo[4,3-c]pyridine, hydrochloride A. 3,5-Bis(o-chlorobenzylidene)-1-methyl-4-piperidone, hydrochloride A mixture of 1-methyl-4-piperidone (22.6 g; 0.2 mole), 85 g (0.6 mole) of o-chlorobenzaldehyde, conc. Hcl (66 ml) and EtOH (300 ml) are refluxed together for 5 hours. After removal of solvent, the crude product weighs 9.3 g (12 percent), mp 218°–220° (dec). Crystallization from 20 ml of hot DMF and 40 ml of MeCN gives 7.9 g (10 percent) of yellow solid; mp 221°–223° (dec). Lit. mp 227°–229° (dec) [JACS, 70, 1825 (1948); different procedure].

B. 7-(o-Chlorobenzylidene)-3-(o-chlorophenyl)-3,3a,4,5,6,7-hexahydro-2,5-dimethyl-2H-pyrazolo[4,3-c]pyridine, hydrochloride The above compound (7.7 g; 0.0195 mole) and 0.96 g (0.02 mole) of methylhydrazine are reacted in 100 ml of MeOH as described in Example 2. Evaporation of the MeOH yields 7.8 g (95 percent) of yellow solid; mp 198°–200°. Following crystallization from 200 ml of EtOH, the light yellow hydrochloride weighs 5.3 g (65 percent); mp 198°–200°.

EXAMPLES 7–10

7-(Substituted benzylidene)-3-(substituted phenyl)-3,3a,5,6,7-hexahydro-2,5-dimethyl-2H-pyrazolo[4,3-c]pyridine, hydrochlorides A. 3,5-Di(substituted benzylidene)-1-methyl-4-piperidone, hydrochloride According to the procedure of Example 6, upon substituting in place of o-chlorobenzaldehyde, one of the following compounds:
  p-methoxybenzaldehyde,
  m-ethylbenzaldehyde,
  o-trifluoromethylbenzaldehyde
  and p-fluorobenzaldehyde,
one obtains:
  3,5-Bis(p-methoxybenzylidene)-1-methyl-4-piperidone, hydrochloride,
  3,5-Bis(m-ethylbenzylidene)-1-methyl-4-piperidone, hydrochloride,
  3,5-Bis(o-trifluoromethylbenzylidene)-1-methyl-4-piperidone, hydrochloride,
  and 3,5-Bis(p-fluorobenzylidene)-1-methyl-4-piperidone, hydrochloride
respectively.

B. 7-(Substituted benzylidene)-3-(substituted phenyl)-3,3a,4,5,6,7-hexahydro-2,5-dimethyl-2H-pyrazolo[4,3-c]pyridine, hydrochlorides According to the procedure of Example 2, upon substituting the above compounds, one obtains:
  7-(p-methoxybenzylidene)-3-(p-methoxyphenyl)-3,3a,4,5,6,7-hexahydro-2,5-dimethyl-2H-pyrazolo[4,3-c]pyridine,hydrochloride;
  7-(m-ethylbenzylidene)-3-(m-ethylphenyl)-3,3a,4,5,6,7-hexahydro-2,5-dimethyl-2H-pyrazolo[4,3-c]pyridine, hydrochloride;
  7-(o-trifluoromethylbenzyzlidene)-3-(o-trifluoromethyl-phenyl)-3,3a,4,5,6,7-hexahydro-2,5-dimethyl-2H-pyrazolo[4,3-c]pyridine, hydrochloride;
  and 7-(p-fluoromethylbenzylidene)-3-(p-fluorophenyl)-3,3a,4,5,6,7-hexahydro-2,5-dimethyl-2H-pyrazolo[4,3-c]pyridine, hydrochloride
respectively.

EXAMPLE 11

7-(p-Chlorobenzylidene)-3-(p-chlorophenyl)3,3a,4,5,6,7-hexahydro-2,5-dimethyl-2H-pyrazolo[4,3-c]pyridine, hydrochloride (1:2)

A. 3,5-Bis(p-chlorobenzylidene)-1-methyl-4-piperidone, hydrochloride

1-Methyl-4-piperidone (22.6 g; 0.2 mole) and 85 g (0.6 mole) of p-chlorobenzaldehyde are reacted in 300 ml of EtOH in the presence of 66 ml of conc. HCl according to Example 6 to give 19 g (24 percent) of crude product; mp 253°–255° (dec). Following crystallization from 120 ml of hot DMF and 240 ml of MeCN, the yellow solid weighs 13.7 g (17 percent); mp 256°–258° (dec).

B. 7-(p-Chlorobenzylidene)-3-(p-chlorophenyl)3,3a,4,5,6,7-hexahydro-2,5-dimethyl-2H-pyrazolo[4,3-c]pyridine, hydrochloride (1:2)

The above material (9 g; 0.023 mole) and 1.15 g (0.025 mole) of methylhydrazine are reacted in 100 ml of MeOH as described in Example 2. It is necessary to add 50 ml more of MeOH while refluxing to obtain a solution. The crude hydrochloride salt weighs 8.2 g (75 percent); mp 132°–134° (dec). Crystallization from 60 ml MeOH–350 ml ether gives 6.7 g (62 percent) of light yellow product; mp 132°–134° (dec).

EXAMPLE 12

7-(m-Chlorobenzylidene)-3-(m-chlorophenyl)-3,3a,4,5,6,7-hexahydro-2,5-dimethyl-2H-pyrazolo[4,3-c]pyridine, hydrochloride (1:2)

A. 3,5-Bis(m-Chlorobenzylidene)-1-methyl-4-piperidone, hydrochloride

A stirred solution of 11.3 g (0.1 mole) of 1-methyl-4-piperidone and 28 g (0.2 mole) of m-chlorobenzaldehyde in 220 ml of 60% EtOh is treated with 11 g (0.17 mole) of 85% KOH. The temperature rises to 38° and a solid separates afer approximately 1 minute. After stirring for 0.5 hour, the solid is filtered, washed with 60% EtOH and air-dried; wt., 22 g, mp 115°–117° (s. 105°). Following crystallization from 80 ml of MeCN; the yellow solid weighs 18.7 g; mp 117°–119°.

A cooled solution of the base in 75 ml of CHCl$_3$ is treated with 8.5 ml of 6.3 N alcoholic HCl and diluted with 600 ml of ether. The HCl salt is precipitated as a gum which soon becomes crystalline; crude yield, after cooling overnight, 20.5 g (52 percent) mp 237°–239° (dec). Crystallization from 50 ml of hot DMF and 100 ml of MeCN gives 16.8 g (43 percent) of yellow product; mp 237°–239° (dec).

B. 7-(m-Chlorobenzylidene)-3-(m-chlorophenyl)-3,3a,4,5,6,7-hexahydro-2,5-dimethyl-2H-pyrazolo[4,3-c]pyridine, hydrochloride (1:2)

The above material (9 g; 0.023 mole) and 1.15 g (0.025 mole) of methylhydrazine are reacted in 150 ml of MeOH as described in Example 2. The crude dihydrochloride salt weighs 9.8 g (94 percent); mp 157°–159° (foam); s, 143°. Following crystallization from 90 ml MeOh–350 ml ether, the pale yellow solid weighs 7.4 g (71 percent); mp 163°–165° (foaming); s. 145°.

EXAMPLE 13

3,3a,4,5,6,7-Hexahydro-2,5-dimethyl-2-(2-pyridyl)-7-(2-pyridylidene)-2H-pyrazolo[4,3-c]pyridine,hydrochloride (1:2)

A. 1-Methyl-3,5-bis-(2-pyridylidene-4-piperidone

1-Methyl-4-piperidone (11.3 g; 0.1 mole) and pyridine-2-carboxaldehyde (32 g; 0.3 mole) are reacted in 150 ml of EtOH containing 33 ml of conc. HCl as described in Example 5. The bulk of EtOH is evaporated and the residue is diluted with 100 ml of H$_2$O, washed with ether (2 × 100 ml; washes discarded), cooled, basified with a cold solution of 20 g of NaOH in 60 ml of H$_2$O, extracted with 3:1 ether-CHCl$_3$ (4 × 25 ml), dried (MgSO$_4$), and the solvents evaporated to give 34.7 g of a dark viscous oil.

The material is chromatographed on basic alumina (Woelm Act. IV 25 g/l g). The desired product is eluted with benzene and 90:10 benzene-EtOAc; crude yield 4.0 g (14 percent); mp 134°–137°. Crystallization from 20 ml of MeCN gives 2.4 g (8.3 percent) of yellow solid; mp 146°–148°. Lit. mp 147° [Buu-Hoi, et al., Bull. Soc. Chim., 1964, 3096 (different procedure)].

B. 3,3a,4,5,6,7-Hexahydro-2,5-dimethyl-2-(2-pyridyl)-7-(2-pyridylidene)-2H-pyrazolo[4,3-c]pyridine, hydrochloride (1:2)

A stirred suspension of the above material (2.4 g; 0.0083 mole) in 30 ml of MeOH is treated with 0.9 ml of 9.5 N alcoholic HCl (1 equiv.) and then reacted with 0.41 g (0.0089 mole) of methylhydrazine as described in Example 2. The crude, foamy, hygroscopic, monohydrochloride salt is dissolved in 20 ml of MeCN and treated with 0.9 ml of 9.5 N alcoholic HCl; a gummy product separates. Ether is added to precipitate the remainder of the material and the product is granulated by rubbing under fresh quantities of ether. Following filtration under N$_2$ and drying in vacuo, the tacky and hygroscopic yellow solid weighs 2.9 g (91 percent). Trituration with 60 ml of boiling 2.2 ketone and cooling gives 2,2 g (69 percent) of a yellow-orange, slightly hygroscopic, solid; mp 165°–167° (foaming); s. 145°.

EXAMPLES 14–17

7-(Substituted benzylidene)-3-phenyl-3,3a,4,5,6,7-hexahydro-2,5-dimethyl-2H-pyrazolo[4,3-c]pyridine,hydrochlorides A. 3-Benzylidene-1-methyl-4-piperidone,hydrochloride (1:1)

A stirred solution of 22.6 g (0.2 mole) of 1-methyl-4-piperidone and 16 g (0.15 mole) of benzaldehyde in 500 ml of EtOH is cooled to 15° and treated portionwise with 66 ml of conc. Hcl; the temperature is not allowed to exceed 25°. After refluxing for 4.5 hours, the bulk of EtOH is evaporated at 1 mm. The residue is diluted to 150 ml with H$_2$O, cooled, basified with a cold solution of 40 g of NaOH in 120 ml of H$_2$O, extracted with ether (4 × 200 ml), dried (MgSO$_4$), and the solvent is evaporated to give 24 g of oil. The latter is redissolved in 300 ml of ether, washed with H$_2$O (4 × 50 ml), dried and the ether is evaporated. The residue (19 g) is distilled to give 3.9 g of the product as a yellow oil; bp 137°– 143°/0.1–0.2 mm.

The base is dissolved in 20 ml of MeCN, cooled, treated with 3.1 ml of 6.3n alcoholic HCl, and diluted to 40 ml with ether. On rubbing and cooling, the crystalline HCl salt gradually separates crude yield 4.1 g (11 percent) mp 148°–151° (s. 135°). Following crystallization from 20 ml of MeCN, the cream-colored material weighs 2.7 g (7.3 percent); mp 150°–152° (s. 138°).

B. 3-Benzylidene-5-substituted-1-methyl-4-piperidone

According to the above procedure of this Example, upon substituting in place of 1-methyl-4-piperidone, the free base of the product of Example 14 (3-benzylidene-1-methyl-4-piperidone) and upon substituting in place of the benzaldehyde, one of the following compounds:

o-chlorobenzaldehyde,
o-(isopropyl)benzaldehyde,
m-trifluoromethylbenzaldehyde and
o-methoxybenzaldehyde one obtains:

3-benzylidene-5-(o-chlorobenzylidene)-1-methyl-4-piperidone hydrochloride,
3-benzylidene-5-(o-isopropyl)benzylidene-1-methyl-4-piperidone hydrochloride,
3-benzylidene-5-m-trifluoromethylbenzylidene-1-methyl-4-piperidone hydrochloride, and
3-benzylidene-5-o-methoxybenzylidene-1-methyl-4-piperidone hydrochloride respectively.

C. 7-(Substituted benzylidene)-3-phenyl-3,3a,4,5,6,7-hexahydro-2,5-dimethyl-2H-pyrazolo[4,3-c]pyridine, hydrochlorides The above material (0.021 mole) and methylhydrazine (0.022 mole) are reacted in 100 ml of MeOH as described in Example 2 to give:

7-(o-chlorobenzylidene)-3-phenyl-3,3a,4,5,6,7-hexahydro-2,5-dimethyl-2H-pyrazolo[4,3-c]pyridine hydrochloride;
7-(o-isopropylbenzylidene)-3-phenyl-3,3a,4,5,6,7-hexahydro-2,5-dimethyl-2H-pyrazolo[4,3-c]pyridine hydrochloride;
7-(m-trifluoromethylbenzylidene)-3-phenyl-3,3a,4,5,6,7-hexahydro-2,5-dimethyl-2H-pyrazolo[4,3-c]pyridine hydrochloride; and
7-(o-methoxybenzylidene)-3-phenyl-3,3a,4,5,6,7-hexahydro-2,5-dimethyl-2H-pyrazolo[4,3-c]pyridine hydrochloride respectively.

EXAMPLE 18

7-Benzylidene-5-butyl-3,3a,4,5,6,7-hexahydro-2-methyl-3-phenyl-2H-pyrazolo[4,3-c]pyridine, hydrochloride (1:2), hydrate A. 3,5-Dibenzylidene-1-butyl-4-piperidone, hydrochloride A stirred solution of 31 g (0.2 mole) of 1-butyl-4-piperidone and 64 g (0.6 mole) of benzaldehyde in 300 ml of EtOH is cooled to 15°, treated dropwise with 66 ml of conc. HCl (the temperature rises to 25°), refluxed for 5 hours, and kept overnight at room temperature.

The bulk of EtOH is evaporated and the syrupy residue is cooled, diluted to 600 ml with H₂O, treated with 300 ml of ether, stirred, and rubbed; a solid gradually separates. After cooling for several hours, the yellow solid is filtered, washed with ether, and air-dried; weight, 36.7 g (50 percent); mp 203°–205°. Following crystallization from 100 ml of DMF, the material weighs 24.2 g (33 percent); mp 212°–214°.

B. 7-Benzylidene-5-butyl-3,3a, 4,5,6,7-hexahydro-2-methyl-3-phenyl-2H-pyrazolo[4,3-c]pyridine, hydrochloride (1:2), hydrate The above prepared material (7.7 g; 0.021 mole) and 1.04 g (0.022 mole) of methylhydrazine are reacted in 100 ml of MeOH as described in Example 2. The crude dihydrochloride salt weighs 6.4 g (68 percent), mp 133°–136° (s.110°). Crystallization from 50 ml MeOH—300 ml ether gives 5.0 g (53 percent) of a pale yellow product; mp 112°–114° (foaming).

EXAMPLE 19

5-Benzyl-7-benzylidene-3,3a,4,5,6,7-hexahydro-2-methyl-3-phenyl-2H-pyrazolo[4,3-c]pyridine, hydrochloride (1:2)

A. 1-Benzyl-3,5-dibenzylidene-4-piperidone, hydrochloride

Nineteen grams (0.1 mole) of 1-benzyl-4-piperidone and 32 g (0.3 mole) of benzaldehyde is reacted in 150 ml of EtOH in the presence of 33 ml of conc. HCl by the method described in Example 6; crude yield, 23 g (58 percent); mp 210°–212° (dec). Crystallization from 60 ml of hot DMF and 120 ml of MECN gives 14.2 g (36 percent) of yellow solid; mp 216°–218° (dec).

B. 5-Benzyl-7-benzylidene-3,3a,4,5,6,7-hexahydro-2-methyl-3-phenyl-2H-pyrazolo[4,3-c]pyridine, hydrochloride (1:2)

The above prepared material (12 g; 0.030 mole) and 1.5 g (0.032 mole) of methylhydrazine are reacted in 100 ml of MeOH as described in Example 2. The crude dihydrochloride salt weighs 10.8 g (78 percent); mp 156°–158° (foaming). Following crystallization from 80 ml MeOH–250 ml ether, the cream-colored product weighs 9.0 g (65 percent) mp 160°–162° (foaming).

EXAMPLE 20

7-Benzylidene-3,3a,4,5,6,7-hexahydro-2-methyl-5-phenethyl-3-phenyl-2H-pyrazolo[4,3-c]pyridine, hydrochloride (1:2)

A. 3,5-Dibenzylidene-1-phenethyl-4-piperidone, hydrochloride

Twenty-five grams (0.1 mole) of 1-benzyl-4-piperidone and 32 g (0.3 mole) of benzaldehyde are reacted in 150 ml of EtOH in the presence of 33 ml of conc. HCl by the method described in Example 6: crude yield, 23 g (58 percent); mp 210°–212° (dec). Crystallization from 60 ml of hot DMF and 120 ml of MeCN gives 14.2 g (36 percent) of yellow solid; mp 216°–218° (dec).

B. 7-Benzylidene-3,3a,4,5,6,7-hexahydro-2-methyl-5-phenethyl-3-phenyl-2H-pyrazolo[4,3-c]pyridine, hydrochloride (1:2)

The above prepared material (12 g; 0.029 mole) and 1.45 g (0.031 mole) of methylhydrazine are reacted in 200 ml of MeOH as described in Example 2. The crude monohydrochloride salt (13.4 g) is dissolved in 100 ml of MeCN and treated with 4.6 ml of 6.3 N alcoholic HCl. The dihydrochloride salt separates very slowly even on rubbing and standing in the cold room. The crude yield after four days in the cold is 5.2 g (36 percent); mp 134°–136° (foaming). Following crystallization from 40 ml MeOH–150 ml ether, the nearly colorless solid weighs 3.6 g (25 percent); mp 129°–131° (s. 125°).

EXAMPLE 21

5-Acetyl-7-benzylidene-3,3a,4,5,6,7-hexahydro-2-methyl-3-phenyl-2H-pyrazolo[4,3-c]pyridine, hydrochloride (1:1)

A. 1-Acetyl-3,5-dibenzylidene-4-piperidone:

A stirred solution of 14 g (0.1 mole) of N-acetyl-4-piperidone and 23 g (0.22 mole) of benzaldehyde in 60 ml of $Ac_2O$ is treated with 30 ml of $NEt_3$, refluxed for 6 hours, and kept overnight at room temperature.

The red-amber solution is poured into 400 ml of ice water, stirred 2 hours and the heavy oil extracted with ether (3 × 200 ml). The combined extracts are washed with $H_2O$ (3 × 100 ml), dried ($MgSO_4$), and the solvent evaporated to give 24.9 g of oil. This material is triturated with 200 ml of isopropyl ether and cooled overnight to give 12.5 g of a yellow gummy product. Following crystallization from 60 ml of i-PrOH, 2.7 g (8.5 percent) of yellow solid is obtained; mp 136°–138°.

B. 5-Acetyl-7-benzylidene-3,3a,4,5,6,7-hexahydro-2-methyl-3-phenyl-2H-pyrazolo[4,3-c]pyridine, hydrochloride (1:1)

A stirred suspension of the above mentioned material (2.7 g; 0.0085 mole) in 30 ml of MeOH is treated with 0.4 g (0.0087 mole) of methylhydrazine and warmed. The resulting solution is refluxed for 2 hours (turned quite dark) and kept overnight at room temperature.

The MeOH is evaporated to give a foamy solid which becomes granular when triturated with 60 ml of hexane and cooled; weight, 2.4 g, mp 95°–97° s. 65°. Following crystallization from isopropyl ether, the pale yellow solid weighs 1.8 g mp 115°–117°.

EXAMPLE 22

7-Benzylidene-3,3a,4,5,6,7-hexahydro-2-methyl-3-phenyl-2H-pyrazolo[4,3-c]pyridine, hydrochloride A. 3,5-Dibenzylidene-4-piperidone, hydrochloride Fourteen grams (0.1 mole) of N-acetyl-4-piperidone and 32 g (0.3 mole) of benzaldehyde are reacted in 150 ml of EtOH containing 33 ml of conc. HCl by the method described in Example 6. A solid separates after approximately 45 minutes of refluxing. Refluxing is continued for a total of 6 hours, and the mixture is kept overnight at room temperature.

The light yellow solid is filtered, washed with EtOH, then with ether, and air-dried; weight 26 g (83 percent); mp 273°–275° (dec). Lit. mp 270°–278° [J Org. Chem., 14, 535 (1949)]; 276°–277° [JACS, 53, 2692 (1931)]

B. 7-Benzylidene-3,3a,4,5,6,7-hexahydro-2-methyl-3-phenyl-2H-pyrazolo[4,3-c]pyridine, hydrochloride The above prepared material (9.5 g; 0.0305 mole) and 1.5 g (0.032 mole) of methylhydrazine are reacted in 200 ml of MeOH as described in Example 2. Evaporation of the MeOH leaves a solid residue which on trituration with ether and cooling gives 9.5 g (92 percent) of product; mp 210°–212°. Following crystallization from 250 ml of EtOH, the light yellow material weighs 6.0 g (58 percent); mp 218°–220°.

EXAMPLE 23

7-Benzylidene-3,3a,4,5,6,7-hexahydro-5-methyl-3-phenyl-2H-pyrazolo[4,3-c]pyridine-2-ethanol, hydrochloride (1:2)

A suspension of 10 g (0.0306 mole) of 3,5-dibenzylidene-1-methyl-4-piperidone, hydrochloride in 100 ml of MeOH is treated with 2.35 g (0.31 mole) of (2-hydroxyethyl)hydrazine; a solid rapidly separates. The mixture is heated and the resulting solution is refluxed for 4 hours, cooled, and the bulk of MeOH evaporated to give 12.5 g of a golden yellow foamy residue. The latter is triturated with ether, cooled overnight, filtered, and dried in vacuo; weight 11.6 g; mp 100°–102°. A cooled solution of this material in 100 ml of $CH_3CN$ is treated with 4.8 ml of 6.4 N ethanolic HCl. On rubbing, the crystalline 2 HCl salt separates. After cooling overnight, the yellow solid is filtered, washed with $CH_3CN$ and ether, and dried in vacuo; weight 8.2 g (61 percent); mp 135°–137° (foaming). Following crystallization from 70 ml MeOH–150 ml ether, the light yellow material weighs 6.2 g (47 percent); mp 142°–144° (foaming).

EXAMPLE 24

7-Benzylidene-3,3a,4,5,6,7-hexahydro-5-methyl-3-phenyl-2-propyl-2H-pyrazolo[4,3-c]pyridine, hydrochloride (1:2)

3,5-Dibenzylidene-1-methyl-4-piperidone, hydrochloride (10 g; 0.031 mole) and the above propylhydrazine (2.3 g; 0.031 mole) are reacted in 100 ml of MeOH as described in Example 2. The crude monohydrochloride salt weighs 12 g; mp 82°–85° (s. 60°). The yield of the crude di HCl salt is 7.0 g (52 percent); mp 121°–124°. Following crystallization from 50 ml MeOH–350 ml ether, the light yellow material weighs 6.1 g (46 percent); mp 124°–126° (foaming).

EXAMPLE 25

7-Benzylidene-3,3a,4,5,6,7-hexahydro-5-methyl-2-phenethyl-3-phenyl-2H-pyrazolo[4,3-c]pyridine, hydrochloride Ten grams (0.0306 mole) of 3,5-dibenzylidene-1-methyl-4-piperidone hydrochloride and 4.3 g (0.031 mole) of phenethylhydrazine are reacted in 100 ml of MeOH as described in Example 2 to give 14 g of a foamy monohydrochloride salt. This material is crystallized from 70 ml of $CH_3CN$ to give 9.7 g (71 percent) of a pale yellow solid; mp 182°–184°.

EXAMPLE 26

7-Benzylidene-3,3a,4,5,6,7-hexahydro-5-methyl-2-p-chlorophenethyl-3-phenyl-2H-pyrazolo[4,3-c]pyridine, hydrochloride Ten grams (0.0306 mole) of 3,5-dibenzylidene-1-methyl-4-piperidone hydrochloride and 4.3 g (0.031 mole) of p-chlorophenethylhydrazine are reacted in 100 ml of MeOH as described in Example 2 to give a foamy hydrochloride salt.

EXAMPLE 27

2-Acetyl-7-benzylidene-3,3a,4,5,6,7-hexahydro-5-methyl-3-phenyl-2H-pyrazolo[4,3-c]pyridine, hydrochloride (1:1)

A stirred suspension of 10 g (0.026 mole) of the material prepared in Example 1 in 250 ml of $Ac_2O$ is heated to obtain a solution, refluxed for 4 hours, concentrated on a rotary evaporator to remove approximately two-thirds of the $Ac_2O$, diluted with several volumes of ether to precipitate the solid product, and cooled overnight.

The light tan material is filtered, washed with ether, and dried in vacuo; weight, 5.7 g (58 percent); mp 243°–245° (dec). Crystallization from 50 ml of MeOH gives 3.4 g (35 percent) of colorless product; mp 253°–255° (dec).

EXAMPLE 28

7-Benzylidene-3,3a,4,5,6,7-hexahydro-2,5-dimethyl-3-phenyl-2H-pyrazolo[4,3-c]pyridine, N-oxide, hydrochloride (1:2)

A solution of the free base from Example 2 (mp 100°–102°) in acetic acid is treated with an equivalent quantity of 30 percent hydrogen peroxide and the solution then heated at 80°–90° for 1 hour and cooled. The solvent is removed on a rotary evaporator at reduced pressure. The residue is dissolved in chloroform and treated with two equivalents of hydrogen chloride. Evaporation of the solvent yields the products.

EXAMPLE 29

Preparation of capsule formulation

| Ingredient | Milligrams per Capsule |
|---|---|
| 7-Benzylidene-3,3a,4,5,6,7-hexahydro-2,5-dimethyl-3-phenyl-2H-pyrazolo[4,3-c]-pyridine,dihydrochloride (1:2) | 200 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 30

Preparation of tablet formulation

| Ingredient | Milligrams per Tablet |
|---|---|
| 7-Benzylidene-3,3a,4,5,6,7-hexahydro-2-methyl-3-phenyl-2H-pyrazolo[4,3-c]pyridine, hydrochloride | 50 |
| Lactose | 250 |
| Corn starch (for mix) | 75 |
| Corn starch (for paste) | 75 |
| Magnesium stearate | 8 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tableting machine. Each tablet contains 300 milligrams of active ingredient.

EXAMPLE 31

Preparation of oral syrup formulation

| Ingredient | Amount |
|---|---|
| 7-Benzylidene-3,3a,4,5,6,7-hexahydro-2,5-dimethyl-3-phenyl-2H-pyrazolo[4,3-c]pyridine,dihydrochloride (1:2) | 500 mg. |
| Sorbitol solution (70% N.F.) | 40 ml. |
| Sodium benzoate | 150 mg. |
| Saccharin | 10 mg. |
| Red Dye (F.D. & C. No. 2) | 10 mg. |
| Cherry flavor | 50 mg. |
| Distilled water ... qs to | 100 ml. |

The sorbitol solution is added to 40 milliliters of distilled water and the active ingredient is suspended therein. The saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose or methylcellulose may be used. Phosphates, citrates or tartrates may be added as buffers. Preservatives may include the parabens, sorbic acid and the like and other flavors and dyes may be used in place of those listed above.

What is claimed is:

1. A compound of the formula

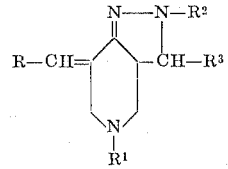

wherein R and R$^3$ are selected from the group consisting of

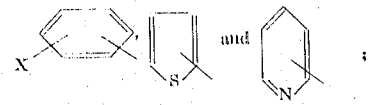

X and X$^1$ are selected from the group consisting of hydrogen, chloro, fluoro, lower alkyl, lower alkoxy and trifluoromethyl; R$^1$ and R$^2$ are selected from the group consisting of hydrogen, lower alkyl,

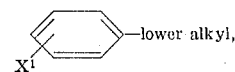

hydroxy lower alkyl and lower alkanoyl and N-oxides and acid addition salts thereof.

2. The compounds of claim 1 wherein R and R$^3$ are phenyl, X and X$^1$ are hydrogen, R$^1$ is hydrogen or lower alkyl and R$^2$ is lower alkyl and N-oxides and acid addition salts thereof.

3. The compound of claim 1 having the name 7-Benzylidene-3,3a,4,5,6,7-hexahydro-2,5-dimethyl-3-phenyl-2H-pyrazolo[4,3-c]pyridine, dihydrochloride.

4. The compound of claim 1 having the name 7-Benzylidene-3,3a,4,5,6,7-hexahydro-2-methyl-3-phenyl-2H-pyrazolo[4,3-c]pyridine, dihydrochloride.

5. The compound of claim 1 having the name 7-(m-Chlorobenzylidene)-3-(m-chlorophenyl)-3,3a,4,5,6,7-hexahydro-2,5-dimethyl-2H-pyrazolo[4,3-c]pyridine, dihydrochloride.

6. The compound of claim 1 having the name 7-Benzylidene-3,3a,4,5,6,7-hexahydro-2-methyl-5-phenethyl-3-phenyl-2H-pyrazolo[4,3-c]pyridine, dihydrochloride.

7. The compound of claim 1 having the name 7-Benzylidene-3,3a,4,5,6,7-hexahydro-5-methyl-3-phenyl-2H-pyrazolo[4,3-c]pyridine-2-ethanol, dihydrochloride, hydrate.

8. The compound of claim 1 having the name 5-Benzyl-7-benzylidene-3,3a,4,5,6,7-hexahydro-2-methyl-3-phenyl-2H-pyrazolo[4,3c]pyridine, dihydrochloride.

9. The compound of claim 1 having the name 7-Benzylidene-3,3a,4,5,6,7-hexahydro-5-methyl-2-phenethyl-3-phenyl-2H-pyrazolo[4,3-c]pyridine, hydrochloride.

* * * * *

UNITED STATES PATENT OFFICE
CERTIFICATE OF CORRECTION

PATENT NO. : 3,852,279
DATED : Dec. 3, 1974
INVENTOR(S) : John Krapcho et al.

It is certified that error appears in the above-identified patent and that said Letters Patent are hereby corrected as shown below:

In the abstract, 2nd line, "[4.3-e]" should read --[4.3-c]--.

Col. 1, line 51, "means" should read --mean--.

Col. 2, line 55, "120°c" should read --120°C--.

Col. 4, line 42, "Hcl" should read --HCl--.

Col. 5, line 12, "dried in desiccator" should read --dried in a desiccator--.

Col. 5, line 61, "Hcl" should read --HCl--.

Col. 6, line 18, "3,3a,5,6,7" should read --3,3a,4,5,6,7--.

Col. 7, line 41, "afer" should read --after--.

Col. 7, line 65, "MeOh" should read --MeOH--.

Col. 8, line 39, "2.2" should be deleted and --methylethyl-- should be inserted in its place.

Col. 8, line 40, "2,2" should read --2.2--.

Col. 8, line 53, "Hcl" should read --HCl--.

Col. 10, line 24, "MECN" should read --MeCN--.

Col. 12, line 1, "0.31 mole" should read --0.031 mole--.

Col. 13, line 17, "products" should read --product--.

Col. 14, in claims 3 and 4, "claim 1" should read --claim 2--.

Signed and Sealed this ninth Day of September 1975

[SEAL]

Attest:

RUTH C. MASON
Attesting Officer

C. MARSHALL DANN
Commissioner of Patents and Trademarks